United States Patent
Morris et al.

(10) Patent No.: US 11,538,338 B2
(45) Date of Patent: Dec. 27, 2022

(54) PROVIDING MAP FRAGMENTS TO A DEVICE

(71) Applicant: Verizon Connect Inc., Atlanta, GA (US)

(72) Inventors: John Thomas Morris, Round Rock, TX (US); Bryan P. Maus, Round Rock, TX (US); Michael G. McKinney, Austin, TX (US); Ralph J. Maier, Austin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 437 days.

(21) Appl. No.: 16/140,007

(22) Filed: Sep. 24, 2018

(65) Prior Publication Data

US 2020/0098258 A1    Mar. 26, 2020

(51) Int. Cl.
| | |
|---|---|
| *G08G 1/0968* | (2006.01) |
| *G08G 1/0967* | (2006.01) |
| *G08G 1/052* | (2006.01) |
| *G06F 16/29* | (2019.01) |

(52) U.S. Cl.
CPC ....... *G08G 1/096822* (2013.01); *G06F 16/29* (2019.01); *G08G 1/052* (2013.01); *G08G 1/0967* (2013.01)

(58) Field of Classification Search
CPC ............ G08G 1/0967; G08G 1/052; G08G 1/096741; G08G 1/096775; G08G 1/096716; G08G 1/096822; G01C 21/3889; G06F 16/29
See application file for complete search history.

(56) References Cited

U.S. PATENT DOCUMENTS

| | | | |
|---|---|---|---|
| 9,539,901 B1* | 1/2017 | Clauss | G08G 1/0969 |
| 2006/0190164 A1* | 8/2006 | Glaza | G01C 21/34 701/421 |
| 2008/0162028 A1* | 7/2008 | Satoh | G08G 1/09675 701/118 |
| 2013/0103726 A1* | 4/2013 | Tjin | G06F 16/29 707/827 |
| 2014/0108361 A1* | 4/2014 | Biswas | G06F 16/29 707/693 |
| 2014/0149372 A1* | 5/2014 | Sankar | G06F 16/9535 707/706 |

(Continued)

*Primary Examiner* — Abby Y Lin
*Assistant Examiner* — Danielle Marie Jackson

(57) ABSTRACT

A device can receive, from a client device, information identifying a location of the client device and determine at least one of an expected future location of the client device or the expected route of the client device based on the information identifying the location of the client device and at least one of: information identifying one or more expected possible routes e associated with the client device, or information identifying a route history associated with the client device, determine, based on the expected future location of the client device, information representing a map fragment and can determine speed limit information associated with the map fragment and, transmit, to the client device, the information representing the map fragment and the speed limit information, wherein the client device is to use the information representing the map fragment and the speed limit information to determine a speeding event associated with a vehicle.

20 Claims, 10 Drawing Sheets

(56) References Cited

U.S. PATENT DOCUMENTS

| | | | |
|---|---|---|---|
| 2014/0278051 A1* | 9/2014 | McGavran | G06N 20/00 |
| | | | 701/400 |
| 2015/0067040 A1* | 3/2015 | Zhu | H04L 67/42 |
| | | | 709/203 |
| 2015/0308847 A1* | 10/2015 | Hilbrandie | G08G 1/096888 |
| | | | 701/119 |
| 2016/0007233 A1* | 1/2016 | Rao | H04W 72/1242 |
| | | | 455/452.2 |
| 2016/0223355 A1* | 8/2016 | Habib | G01C 21/3667 |
| 2016/0380820 A1* | 12/2016 | Horvitz | G06N 5/04 |
| | | | 370/254 |
| 2019/0186946 A1* | 6/2019 | Liu | G09B 29/106 |
| 2021/0180987 A1* | 6/2021 | Terada | G01C 21/30 |

\* cited by examiner

PROVIDING MAP FRAGMENTS TO A DEVICE

BACKGROUND

Speed alert systems can provide feedback to a driver when the driver's vehicle exceeds a particular speed. Speed alert systems can be integrated into the vehicle or be stand-alone systems. Speed alert systems can incorporate multiple devices which communicate with each other, such as mapping platforms, in-vehicle client devices, and/or the like, to transmit data associated with the vehicle's location, speed, and/or the like.

DETAILED DESCRIPTION OF PREFERRED EMBODIMENTS

Figure 1A:
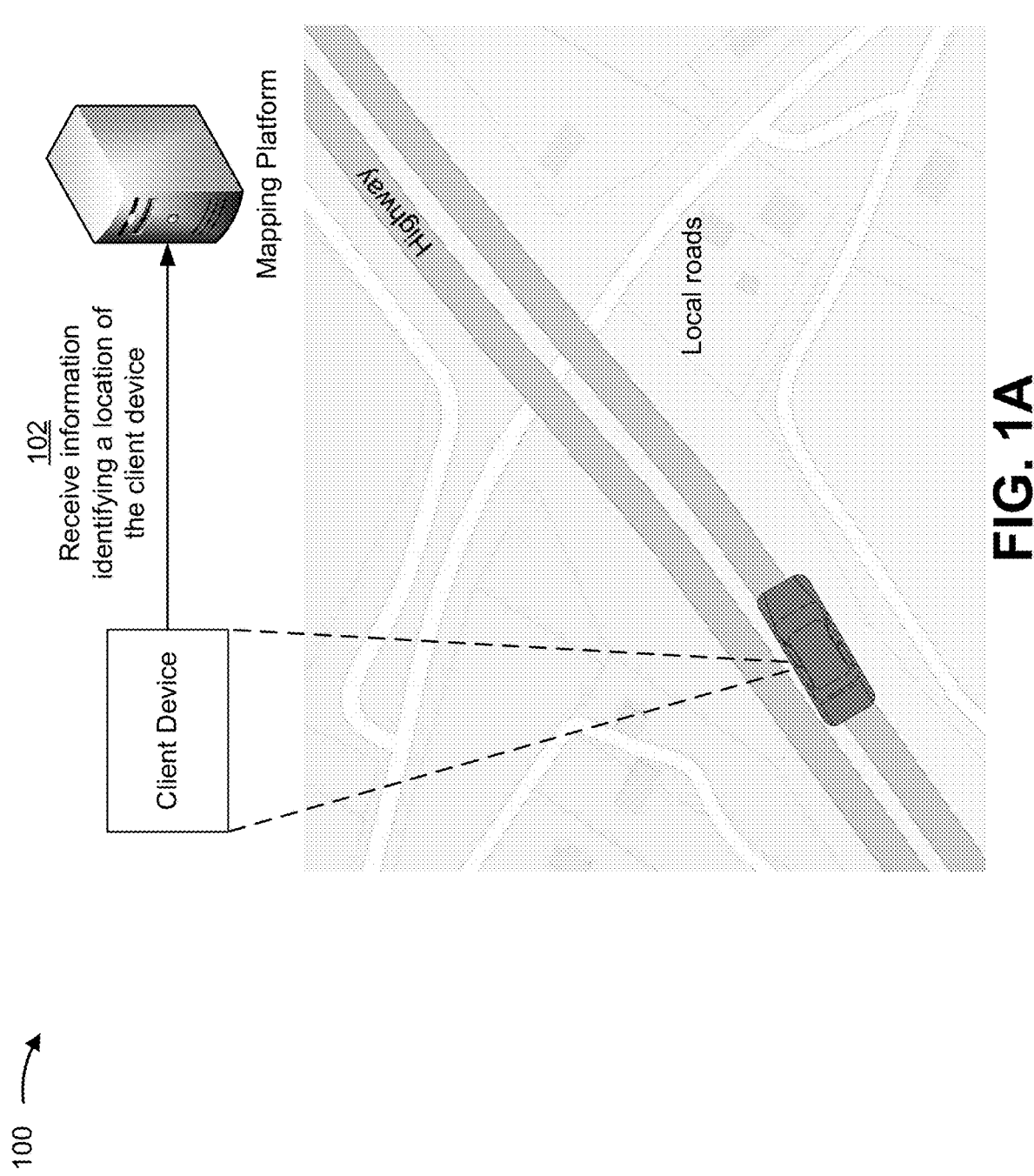
FIGS. 1A-1G are diagrams of an example implementation described herein.

The following detailed description of example implementations refers to the accompanying drawings. The same reference numbers in different drawings can identify the same or similar elements.

In some cases, a driver can use an in-vehicle client device to alert the driver that the driver's vehicle is exceeding a particular speed. In some cases, the client device can communicate with another device, such as a mapping platform, to receive speeding information associated with the vehicle's location to determine if the vehicle is exceeding the particular speed. The client device can make the determination that the vehicle is exceeding the particular speed based on receiving information from the mapping platform. However, this can impose cumbersome storage requirements on the client device to be able to store maps locally and continuously update the maps with new speeding information. Additionally, or alternatively, this can impose weighty network requirements to allow the sending and/or receiving of the map information. In some cases, the determination can instead be made by the mapping platform in order to reduce or eliminate storage and/or network issues associated with the client device. However, the latency between the mapping platform determining a speeding event, providing an instruction to the client device to generate a notification of the speeding event, and the client device generating the notification can be too long to be useful. For example, it can take up to 20 seconds or more after the speeding event before the client device generates the notification of the speeding event.

Some implementations described herein provide a mapping platform that is capable of identifying and providing information associated with a map fragment, and speed limit information associated with the map fragment, to a client device, such that the client device can make speeding determinations based on the map fragment and the speed limit information. Some implementations described herein provide a mapping platform that is capable of receiving information identifying a location of the client device. In some implementations, the mapping platform can determine at least one of an expected future location of the client device or an expected route of the client device based on the information identifying the location of the client device and at least one of: information identifying a planned route associated with the client device, or information identifying a route history associated with the client device. In some implementations, the mapping platform can determine, based on at least one of the expected future location of the client device or the expected route of the client device, information representing a map fragment, determine speed limit information associated with the map fragment, and transmit, to the client device, the information representing the map fragment and the speed limit information, wherein the client device can use the information representing the map fragment and the speed limit information to determine a speeding event associated with a vehicle in which the client device is located.

In this way, the mapping platform can transmit, to the client device, information representing a map fragment instead of an entire map, which reduces the amount of network resources used by the mapping platform and the client device by reducing the amount of information transmitted between the mapping platform and the client device. This in turn reduces the amount of storage resources and processing resources of the client device that are used to store mapping and/or speed limit information. Moreover, since the client device receives the information representing the map fragment and the speed limit information from the mapping platform, the client device can determine speeding events locally on the client device, which reduces the latency in determining speeding events, and conserves networking resources that would have otherwise been used by the client device to transmit speed information to the mapping platform so that the mapping platform can determine the speeding events.

FIGS. 1A-1G are diagrams of an overview of an example implementation 100 described herein. As shown in FIGS. 1A-1G, implementation 100 can include various devices, such as a client device, a mapping platform, and/or the like.

In some implementations, the client device can be a device associated with a vehicle. For example, the client device can be a device that is integrated into the vehicle (e.g., a built-in navigation device, a built-in infotainment device, a built-in speed detection device, and/or the like), can be a stand-alone device (e.g., a stand-alone navigation device, a mobile device, a stand-alone speed detection device, and/or the like), and/or the like.

In some implementations, the client device can be capable of detecting a speed of the vehicle, capable of receiving information (e.g., from another device, from the vehicle (e.g., via an onboard diagnostics port in the vehicle, and/or another communications interface), and/or the like) identifying the speed of the vehicle, and/or the like. The client device can determine a speeding event associated with the vehicle based on the speed of the vehicle and based on speed limit information. In some implementations, to obtain the speed limit information, the client device can send location information to another device, such as the mapping platform, and can receive the speed limit information from the mapping platform. In some implementations, the client device can determine the speeding event based on receiving the speed limit information from the mapping platform. In some implementations the client device can be a device capable of generating and emitting a notification based on determining the speeding event. The notification can be an audio notification (e.g., an audible tone, an audible beep, a voice notification, and/or the like), a haptic notification (e.g., a vibration), a visual notification (e.g., if the client device includes a display, a visual indicator associated with the speeding event), and/or the like.

In some implementations, the client device can generate and/or store various types of information, such as location information (e.g., information identifying a current location of the client device, information identifying one or more previous locations of the client device, and/or the like), expected possible route information (e.g., information identifying a planned route to be traversed by the client device, information identifying one or more expected possible routes to be traversed by the client device, and/or the like), route history information (e.g., information identifying one or more routes previously traversed by the client device), and/or the like.

The mapping platform can transmit information to and receive information from the client device. For example, the mapping platform can receive information identifying a location of the client device, information identifying one or more expected possible routes associated with the client device (e.g., information identifying a route that is being traversed by the client device), information identifying a route history associated with the client device (e.g., information identifying one or more routes previously traversed by the client device), and/or the like. In some implementations, the mapping platform can determine an expected future location of the client device (e.g., a geographic location at which the mapping platform expects the client device to be located at a particular future time) and/or an the expected route of the client device based on the information identifying the location of the client device, the information identifying the one or more expected routes associated with the client device, the information identifying a route history associated with the client device, crowdsourced information (e.g., information, received from other client devices, identifying route histories that include the location of the client device), based on road information (e.g., a type of road on which the vehicle associated with the client device is traveling at the identified location of the client device, a direction of traffic associated with the road on which the vehicle associated with the client device is traveling at the identified location of the client device, and/or the like), and/or the like In some implementations, the mapping platform can determine information representing a map fragment and speed limit information associated with the map fragment based on determining the future expected location of the client device. In some implementations, the mapping platform can transmit information representing the map fragment and the speed limit information to the client device.

As shown by FIG. 1A, and by reference number 102, the mapping platform can receive the information identifying the location of the client device. The mapping platform can be configured to receive information automatically based on time-based variables, events, and/or the like. For example, the mapping platform can receive the information identifying the location of the client device at particular time intervals (e.g., every minute, every ten minutes, etc.), at particular distance intervals (e.g., every mile, every five miles, etc.), and/or the like. Additionally, or alternatively, the mapping platform can receive information identifying the location of the client device based on detecting a certain event, such as based on a large change in speed of the vehicle associated with the client device, based on the client device entering a school zone, and/or the like.

The location information can include information identifying a geographical location of the client device (e.g., world geodetic system (WGS) coordinates associated with the client device's geographical location, coordinates associated with the client device's geographical location expressed in another coordinate system, and/or the like), information identifying a road on which the vehicle associated with the client device is traveling, and/or the like. In some implementations, the mapping platform can receive other types of information from the client device, such as expected possible route information, route history information, and/or the like.

In some implementations, the mapping platform can determine whether to transmit information representing a map fragment and/or speed limit information to the client device. In some implementations, the mapping platform can determine whether to transmit the information representing the map fragment and/or the speed limit information based on the information identifying the location of the client device. For example, the mapping platform can determine whether to transmit information representing a map fragment and/or speed limit information to the client device based on the client device initiating a route to be traversed, based on a threshold distance between the location of the client device and a previous expected future location of the client device, based on a time duration since the mapping platform last transmitted a map fragment to the client device, and/or the like.

Figure 1B:
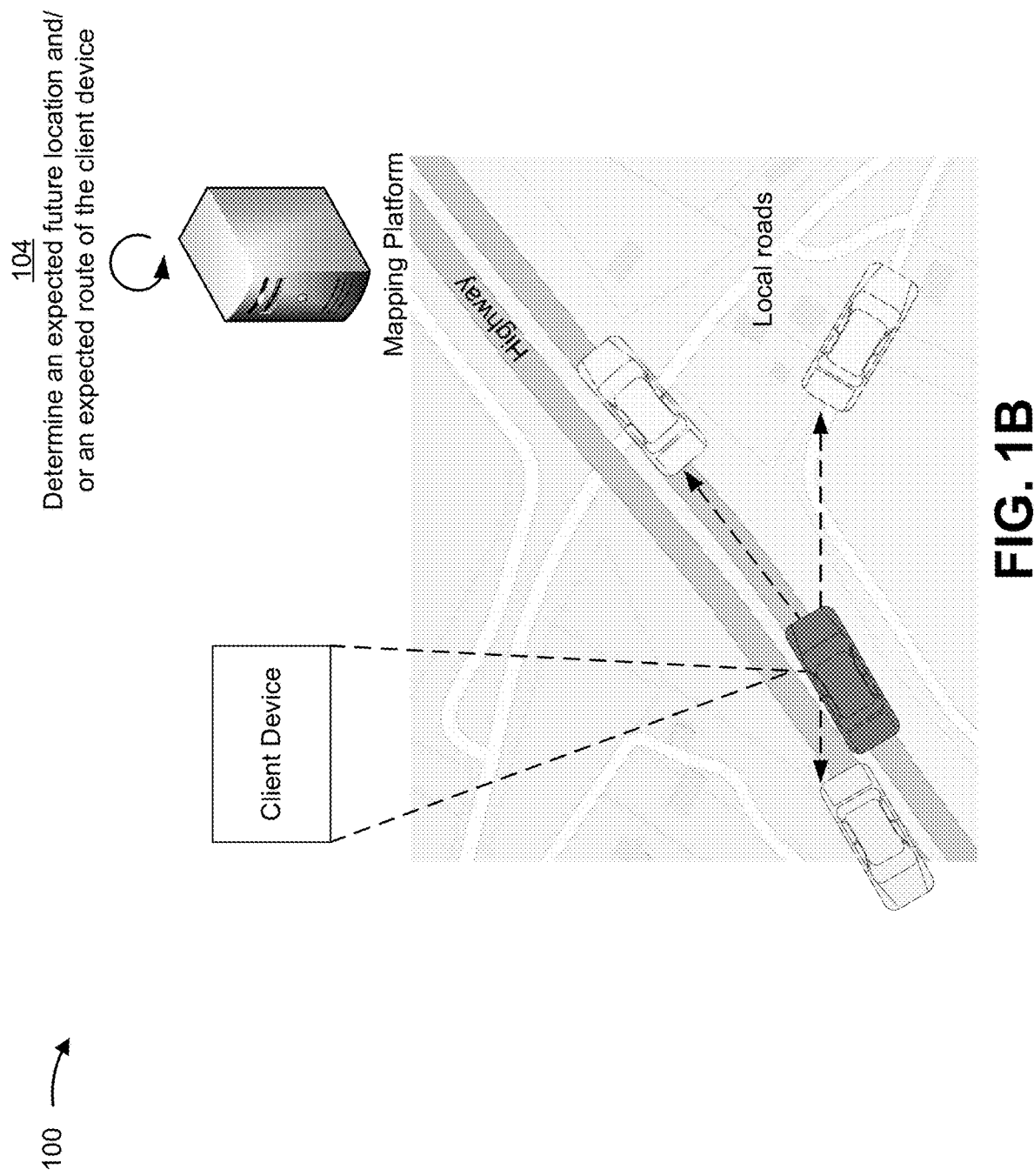

As shown by FIG. 1B, and by reference number 104, the mapping platform can determine an expected future location of the client device and/or an expected route of the client device. In some implementations, the mapping platform can determine an expected future location and/or the expected route of the client device based on the information identifying the location of the client device. In some implementations, to determine the expected future location and/or the expected route of the client device, the mapping platform can identify one or more candidate locations for the expected future location and/or one or more candidate routes for the expected route of the client device. For example, the mapping platform can identify a plurality of roads in a particular geographic radius from the location of the client device, identify a plurality of roads within a particular time radius from the client device, identify a plurality of roads that lead to a particular destination (e.g., a destination associated with one or more expected possible routes, a destination associated with one or more historical routes, and/or the like), and/or the like. In some implementations, the mapping platform can identify the one or more candidate locations and/or the one or more candidate routes based on historical information associated with the client device, such as information identifying one or more previous locations of the client device, routes previously traversed by the client device, and/or the like For example, the mapping platform can determine that the location of the client device is included in a plurality of different routes previously traversed by the client device, and can identify one or more candidate locations and/or one or more candidate routes that are included in each of the routes previously traversed by the client device.

In some implementations, the mapping platform can select the expected future location and/or the expected route of the client device from the one or more candidate locations and/or the one or more candidate routes based on various criteria. For example, the mapping platform can select, as the expected future location and/or the expected route, a candidate location and/or a candidate route that is included in a route that was previously traversed by the client device the greatest quantity of times out other routes previously traversed by the client device that include one or more other candidate locations and/or one or more candidate routes.

As another example, the mapping platform can select the expected future location based on the accessibility of the one or more candidate locations. For example, the mapping platform can determine that a candidate location is located on a local road that is not accessible from a highway road on which the vehicle is traveling for a threshold distance (e.g., five miles, ten miles, etc.), for a threshold time (e.g., five minutes, 10 minutes, etc.), and/or the like, and can therefore not select the candidate location as the expected future location. As another example, the mapping platform can determine that a candidate location and/or a candidate route is not accessible by the vehicle without backtracking or traveling in an opposite direction that the vehicle is currently traveling, and can therefore not select the candidate location and/or the candidate route as the expected future location and/or the expected route. Other examples of selecting the expected future location and/or the expected route based on accessibility of the one or more candidate locations and/or candidate routes include selecting the expected future location and/or the expected route based on construction information, traffic information, hazard information, and/or the like. For example, if multiple nearby roads are closed due to construction, the mapping platform can determine the expected future location and/or the expected route of the client device based on determining a route that is not closed due to construction. In another example, if a road uses special access devices or features, such as high occupancy vehicle (HOV) roads, electronic toll system (e.g., EZPass, I-Pass, and/or the like) roads and/or the like, the mapping platform can determine the expected future location and/or the expected route of the client device based on whether the vehicle with which the client device is associated can use the special access road.

In some implementations, the mapping platform can determine the expected future location and/or the expected route of the client device based on speed, direction of travel, and/or the like. For example, the mapping platform can determine the expected future location of the client device as further up a northbound road based on information indicating that the vehicle is traveling on the northbound road (e.g. instead of a southbound road), the mapping platform can determine the expected future location of the client device is a certain distance based on speed information of the vehicle, and/or the like.

Figure 1C:
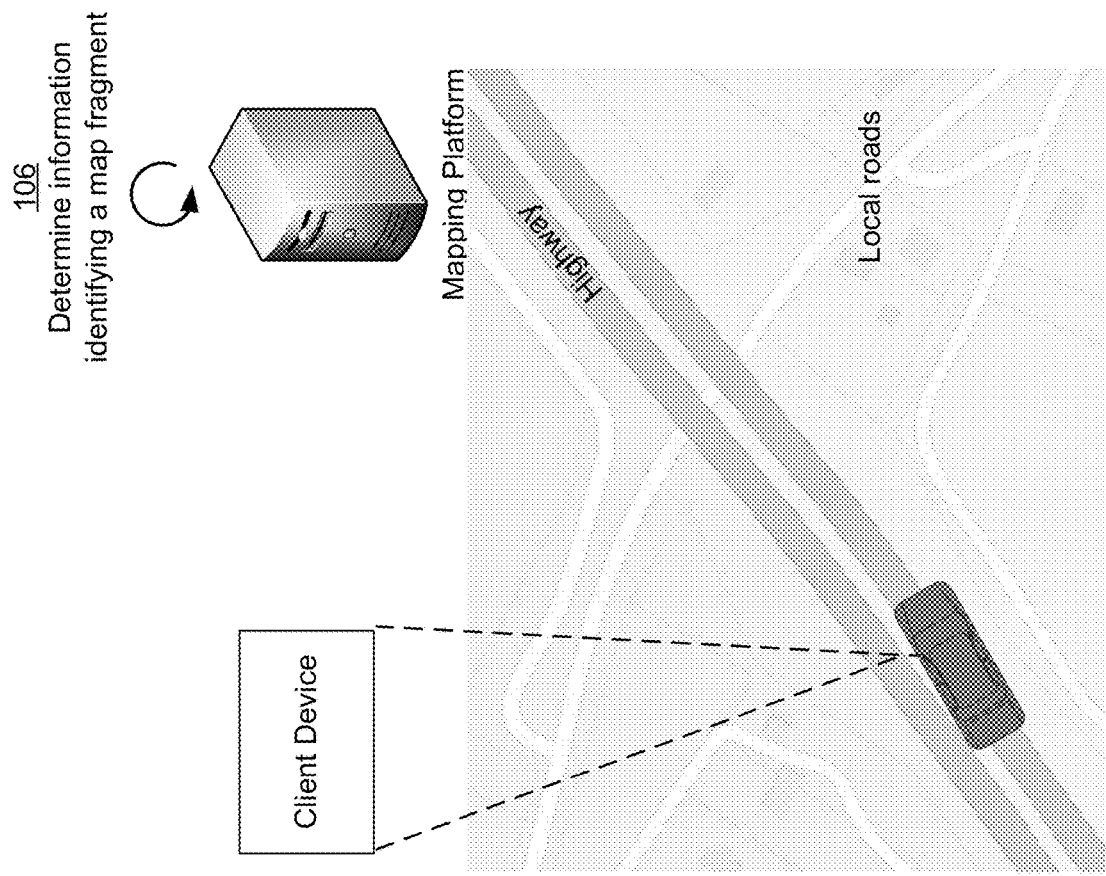

As shown by FIG. 1C, and by reference number 106, the mapping platform can determine information representing a map fragment. The map fragment can be associated with the expected future location and/or the expected route of the client device. In some implementations, the mapping platform can determine the size (e.g., in distance, such as a 10 mile radius map fragment; in time, such as a map fragment that is expected to cover 20 minutes of travel, in electronic data size, such as a map fragment that is 2 megabytes in size or 1 gigabyte in size, and/or the like) of the information representing the map fragment to be transmitted to the client device based on various factors, such as an amount of available storage resources associated with the client device, an amount of storage resources of the client device that is allocated for storing information identifying map fragments, one or more parameters of a network connection of the client device (e.g., based on bandwidth availability of the network connection, based on signal strength of the network connection, based on bandwidth limits specified in a data plan associated with the client device, based on whether the bandwidth of the network connection is being used by higher priority applications on the client device, and/or the like), a type of road on which the vehicle is traveling (e.g., the mapping platform can select larger map fragments for highways and smaller map fragments for local roads, or vice-versa), and/or the like. For example, the mapping platform can send smaller map fragments if the storage resources associated with the client device are low, larger map fragments if the storage resources associated with the client device are high, and/or the like. Additionally, or alternatively, the size of the map fragment can be configured. For example, a user of the client device can set limitations for the storage of the client device or the amount of data that can be transferred through a network connection associated with the client device.

In some implementations, the mapping platform can determine the information to include and/or not include in the information representing the map fragment based on identifying historical location information associated with the client device, expected possible route information associated with the client device, road information, hazard information, construction information, and/or the like. For example, the mapping platform can determine information representing the map fragment based on recognizing the location data from similar location data. In some implementations, the mapping platform can determine the information representing the map fragment based on removing (or not including), from the information representing the map fragment, information identifying one or more roads that are not included in the one or more expected possible routes associated with the client device, information identifying one or more roads that are not included in one or more expected possible routes associated with the client device, information identifying one or more roads that are not accessible (e.g., due to construction, due to an accident, and/or the like), and/or the like. For example, the mapping platform can determine that the client device is located in a vehicle that is traveling on a highway, and is expected to continue traveling on the highway for the next map fragment, and accordingly can remove nearby local roads that are not immediately or closely accessible by the vehicle from the map fragment.

In some implementations, the mapping platform can include a mapping image, associated with the map fragment, in the information representing the map fragment. The mapping platform can determine that the client device includes a display, storage space, network capability, and/or the like, and therefore can be capable of displaying a mapping image associated with the map fragment. The mapping image can be used to visually display the map fragment on the display of the client device for various purposes, such as for navigation purposes, for speeding detection purposes, and/or the like.

Figure 1D:
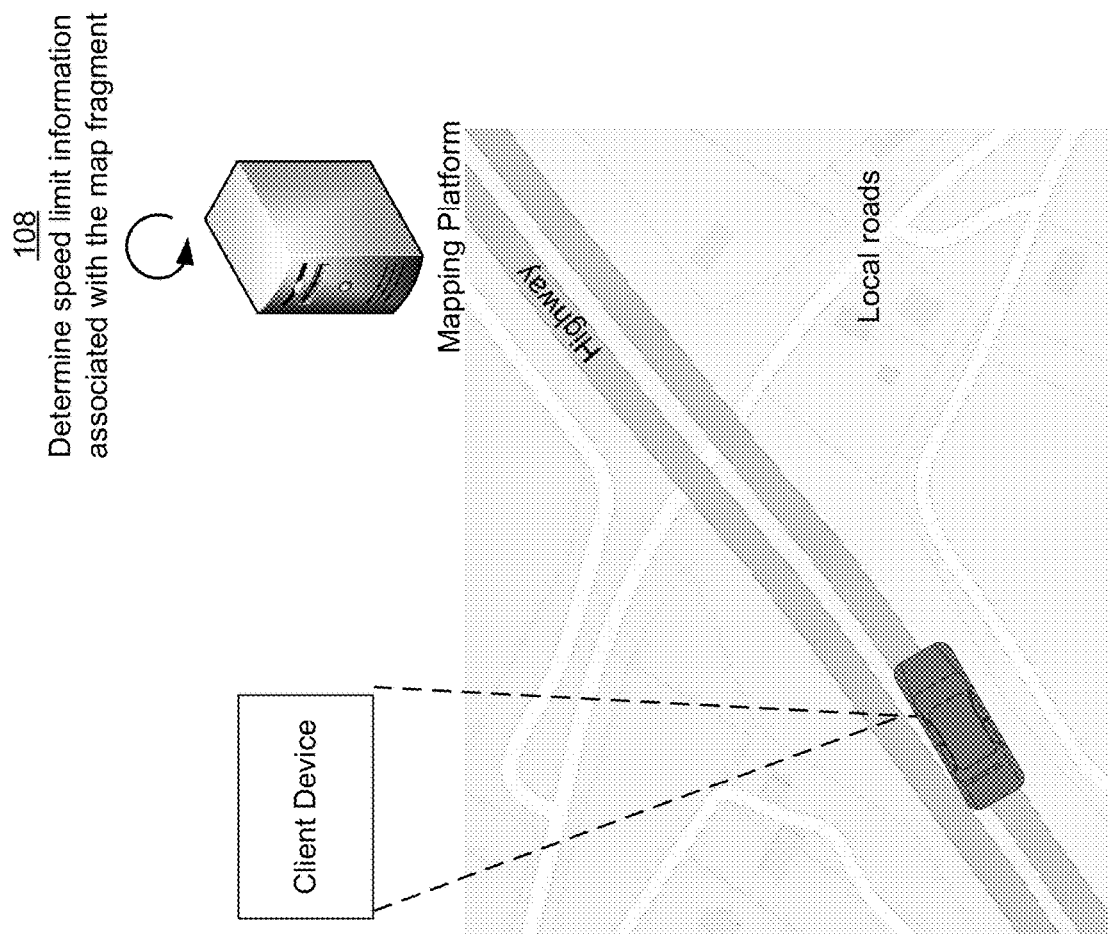

As shown by FIG. 1D, and by reference number 108, the mapping platform can determine speed limit information associated with the map fragment. In some implementations, the mapping platform can send a request for the speed limit information to a database that associates roads with speed limit information. In some implementations, the mapping platform can determine the speed limit information based on data from other sources. For example, the mapping platform can determine the average speeds of other vehicles on a road segment, included in the map fragment, over a period of time and use that average speed as the speed limit for the road segment. Additionally, or alternatively, the mapping platform can receive crowed-sourced speed information for a road segment, included in the map fragment, and use that use that crowd-sourced speed information as the speed limit for the road segment. Additionally, or alternatively, the mapping platform can consider additional variables, such as demographics, user-provided data, and/or the like to determine the speed limit of a road segment. For example, if statistics suggest that a particular age demographic is more likely to drive the exact speed limit, the mapping platform can determine the speed limit by considering the average speeds of vehicles associated with user profiles of that particular age demographic. In this case, the user provided data can be anonymized and/or altered to protect a user's identity and/or privacy.

In some implementations, the mapping platform can determine the speed limit based on the presence of particular factors on a segment of a road. For example, the mapping platform can determine the speed limit by the average speed of drivers on a particular stretch of road after identifying a police officer, speed detector, and/or the like present on the particular stretch of road.

Figure 1E:
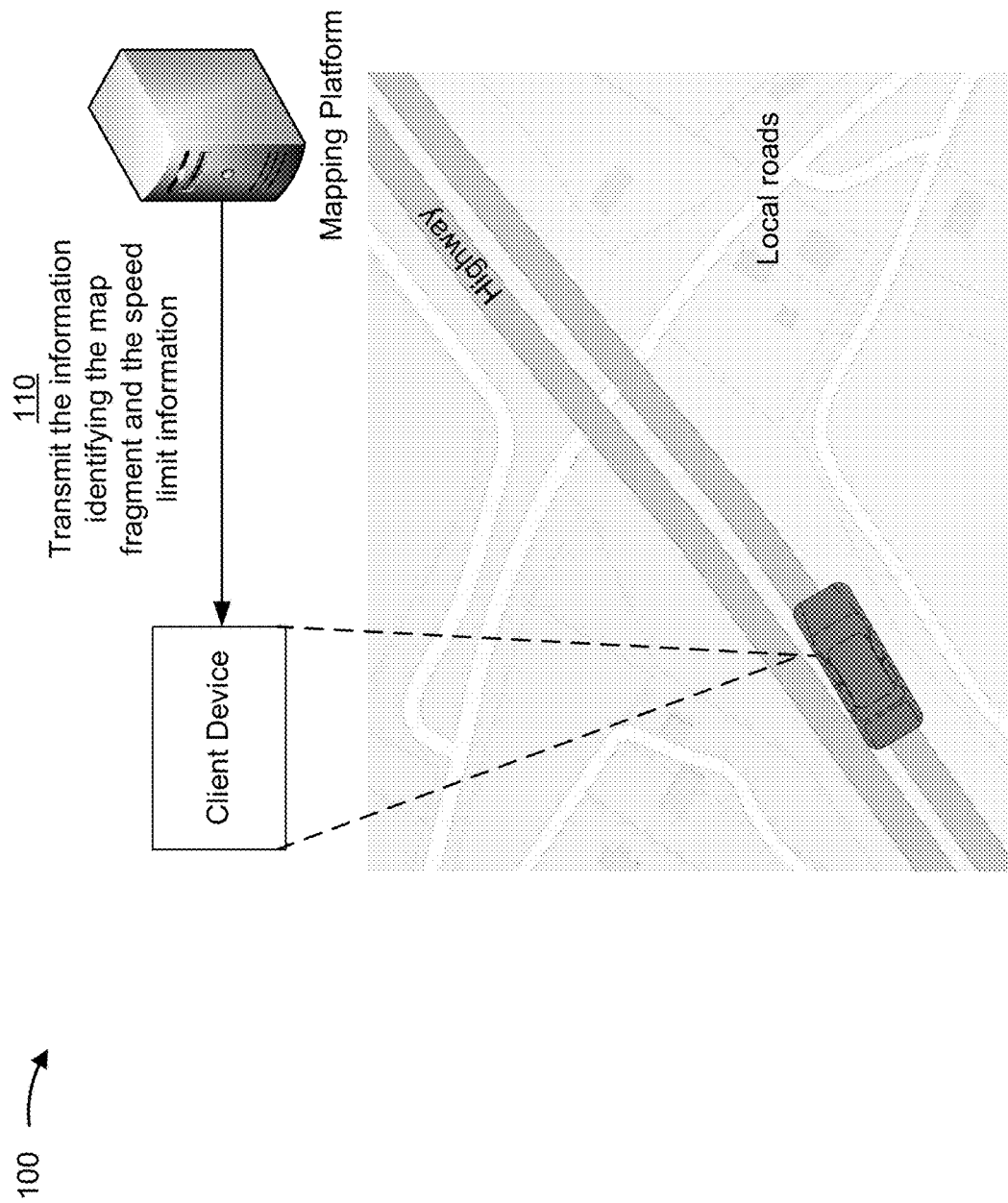

As shown by FIG. 1E, and by reference number 110, the mapping platform can transmit the information representing the map fragment and the speed limit information. In some implementations, when transmitting the information representing the map fragment and the speed limit information, the mapping platform can determine the client device is storing a previous version of the information representing the map fragment, determine the information representing the map fragment and the previous version of the information representing the map fragment are different, and transmit, based on determining the information representing the map fragment and the previous version of the information representing the map fragment are different, the information representing the map fragment. For example, when transmitting the information representing the map fragment and the speed limit information, the mapping platform can determine the client device is storing a previous version of the information representing the map fragment, determine whether a duration of time since the mapping platform transmitted the previous version of the information to the client device satisfies a threshold duration of time, and transmit, based on determining that the duration of time since the mapping platform transmitted the previous version of the information to the client device satisfies a threshold duration of time, the information representing the map fragment and the speed limit information. In some implementations, when transmitting information representing a map fragment and the speed limit information to the client device, the mapping platform can further transmit additional information, such as road hazard information associated with the map fragment (e.g., information identifying a road hazard on one or more roads identified in the map fragment), traffic information associated with the map fragment (e.g., information identifying traffic volume on one or more roads identified in the map fragment, information identifying whether there is traffic congestion on the one or more roads, information identifying increased travel times due to traffic, and/or the like), toll information association with the map fragment (e.g., information identifying one or more roads identified in the map fragment that are toll roads, toll fees associated with the toll roads, and/or the like), construction information associated with the map fragment (e.g., information identifying a construction zone on one or more roads identified in the map fragment, information describing the construction zone (e.g., lane closures, type of construction, and/or the like), and/or the like), and/or the like.

Figure 1F:
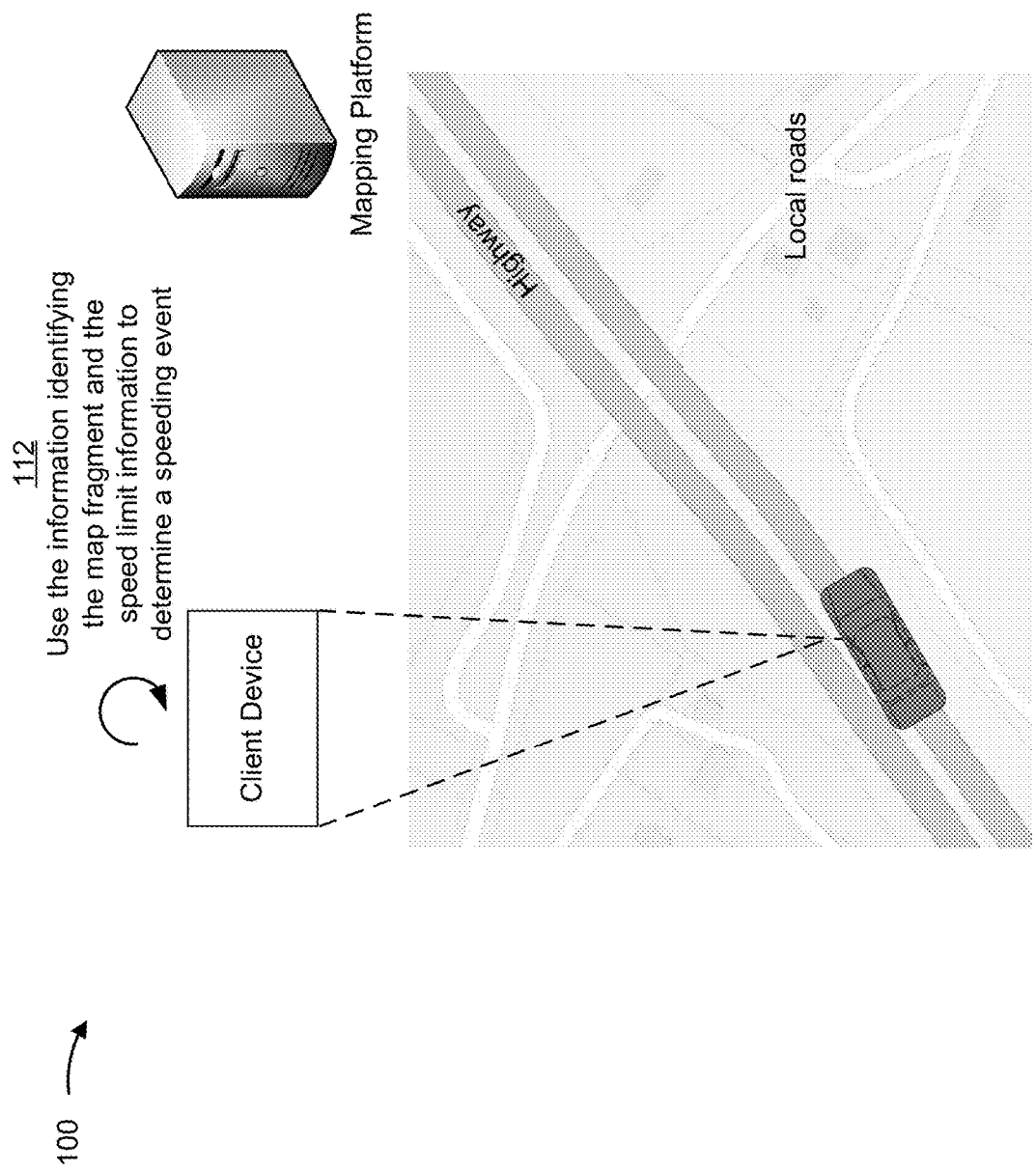

As shown by FIG. 1F, and by reference number 112, the client device can use the information representing the map fragment and the speed limit information to determine a speeding event. The client device can determine a speeding event based on the vehicle's speed being the same or above a speed limit, identified in the received speed limit information, associated with a road segment on which the vehicle is traveling. In some implementations, the client device can determine the speeding event based on the vehicle's speed being the same or above the speed limit for a particular threshold period of time. For example, the client device can determine the speeding event after a plurality of comparisons over a period of time to determine if the vehicle is speeding. In some implementations, the client device can use additional information to determine a suggested speed and determine the speeding event based on the vehicle's speed being above the suggested speed. For example, the client device can determine that adverse weather conditions warrant a suggested speed below a posted speed limit and determine the speeding event if the vehicle exceeds the suggested speed. The client device can use the speed from a geographic positioning device, speedometer, vehicle telematics, and/or the like to determine the speed of the vehicle.

Figure 1G:
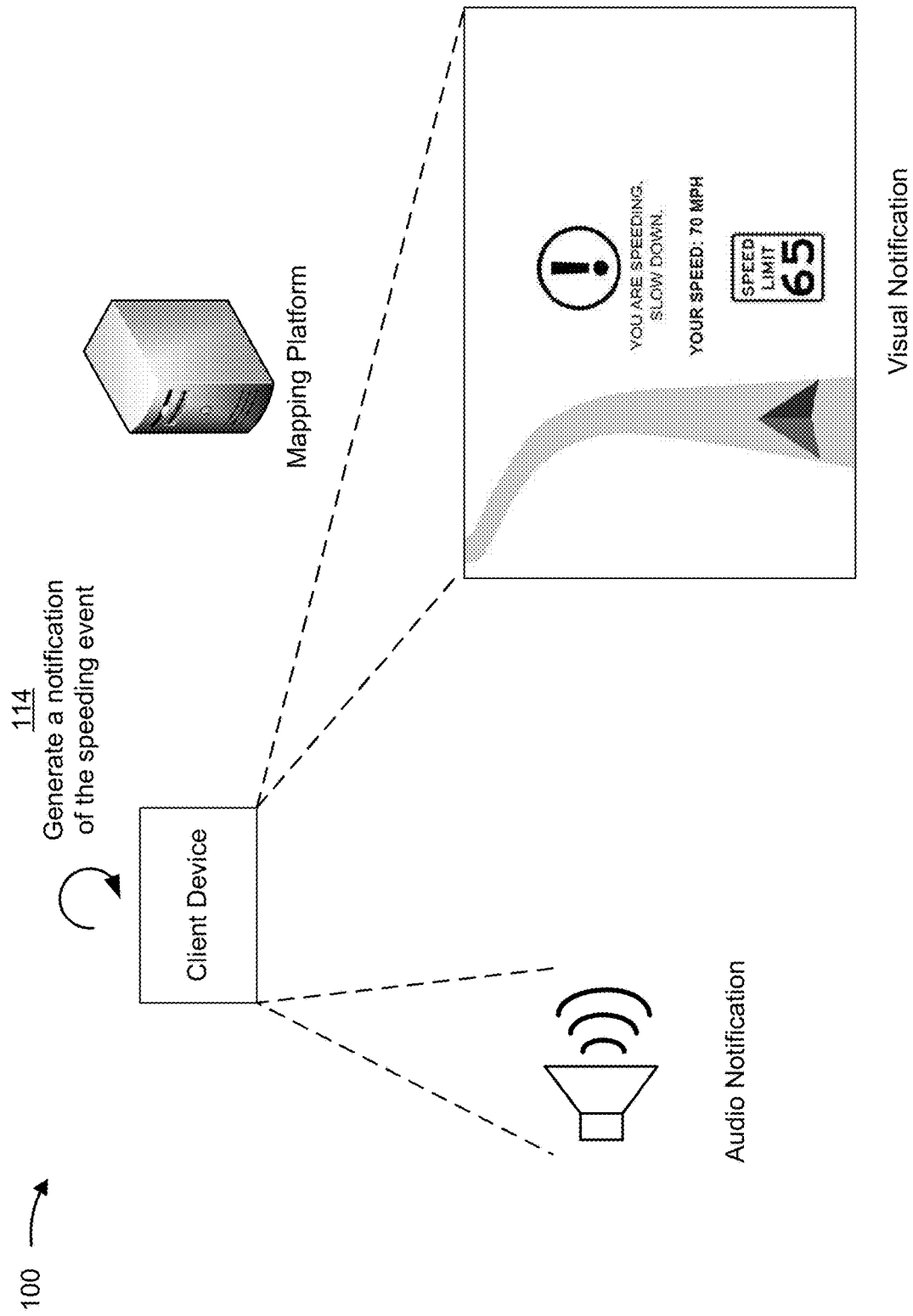

As shown by FIG. 1G, and by reference number 114, the client device can generate a notification of the speeding event. The notification can include an audio notification (e.g., a beep, a tone, a voice recording, and/or the like), a visual notification, a haptic notification (e.g., a vibration), and/or the like. For example, the visual notification can include displaying, on a display of the client device, text (e.g., "YOU ARE SPEEDING"), flashing colors, a change in the display color, a change in the color of a specific icon on the display, and/or the like to provide visual feedback. In some implementations, the client device can display the visual indicator as an overlay on a map image being displayed by the client device. Additionally, or alternatively, the client device can generate haptic feedback for notification, such as emitting a vibration, increasing the resistance of the acceleration pedal, and/or the like. In some implementations, the client device can transmit notification of speeding back to the mapping platform. The mapping platform can then compile data on speeding events of the client device to evaluate safe driving, insurance rates, and/or the like.

In some implementations, the client device can receive the additional information from the mapping platform, and can generate a notification of a road hazard associated with the map fragment, can generate a notification of a construction zone associated with the map fragment, can generate a toll road notification associated with the map fragment, and/or the like. In some implementations, where the vehicle is an autonomous vehicle, a semi-autonomous vehicle, a vehicle with self-driving capabilities, and/or the like, the client device can use the information representing the map fragment and the speed limit information to automatically control the speed at which the vehicle is traveling. For example, the client device can detect, based on the information representing the map fragment and the speed limit information, a change in a speed limit on a road on which the vehicle is traveling, and can accordingly adjust the speed at which the vehicle is traveling (e.g., by increasing and/or decreasing the speed of the vehicle).

In this way, the mapping platform can transmit, to the client device, information representing a map fragment instead of an entire map, which reduces the amount of network resources used by the mapping platform and the client device by reducing the amount of information transmitted between the mapping platform and the client device. This in turn reduces the amount of storage resources and processing resources of the client device that are used to store mapping and/or speed limit information. Moreover, since the client device receives the information representing the map fragment and the speed limit information from the mapping platform, the client device can determine speeding events locally on the client device, which reduces the latency in determining speeding events, and conserves networking resources that would have otherwise been used by the client device to transmit speed information to the mapping platform so that the mapping platform can determine the speeding events.

As indicated above, FIGS. 1A-1G are provided merely as an example. Other examples are possible and can differ from what was described with regard to FIGS. 1A-1G.

Figure 2:
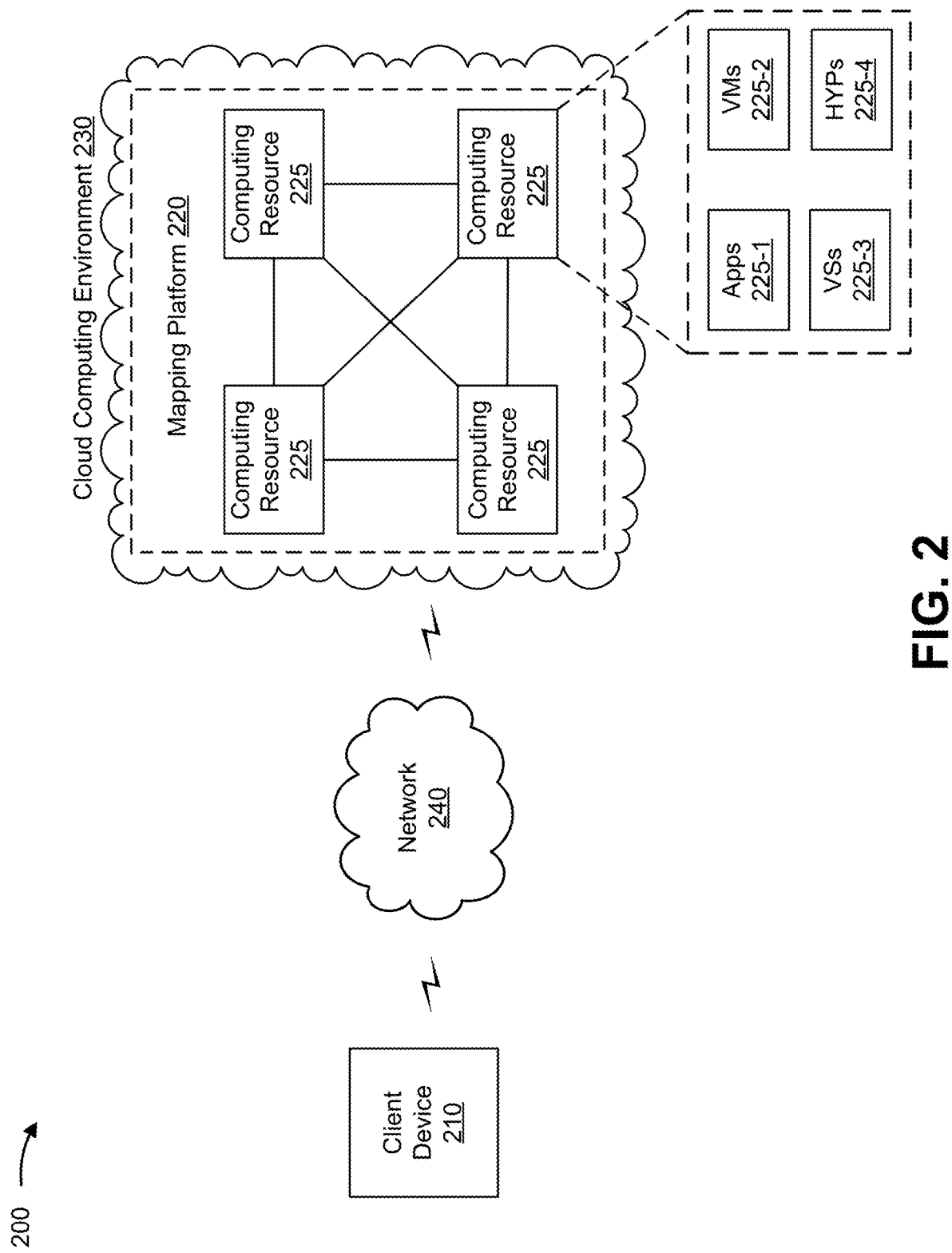
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a client device 210, a mapping platform 220, a computing resource 225, a cloud computing environment 230, and a network 240. Devices of environment 200 can interconnect via wired connections, wireless connections, or a combination of wired and wireless connections.

Client device 210 includes one or more devices capable of receiving, generating, storing, processing, and/or providing information associated with determining a speeding event associated with a vehicle. For example, client device 210 can be a device that is integrated into the vehicle, such as a built-in navigation device, a built-in infotainment device, a built-in speed detection device, and/or the like; can be a stand-alone device, such as a stand-alone navigation device, a mobile device, a stand-alone speed detection device, a device that is capable of being communicatively connected with the vehicle (e.g., via an onboard diagnostics communications port, Bluetooth, Wi-Fi, universal serial bus (USB), and/or the like); and/or the like. In some implementations, client device 210 can include a device capable of determining a location of client device 210, such as through geographic positioning coordinates, road information, and/or the like, and providing information, identifying the location, to mapping platform 220. In some implementations, client device 210 can receive, from mapping platform 220, information representing a map fragment, speed limit information, and/or other types of information. In some implementations, client device 210 can determine a speeding event, associated with the vehicle, based on the received information representing the map fragment, based on the speed limit information, and/or the like. In some implementations, client device 210 can be a device capable of generating an auditory, visual, and/or haptic notification based on determining the speeding event. In some implementations, client device 210 can include a touch screen display, a monitor, and/or the like.

Mapping platform 220 includes one or more computing resources assigned to provide map fragments to client device 210. For example, mapping platform 220 can be a platform implemented by cloud computing environment 230 that can receive, from client device 210, information identifying a location of client device 210, that can determine an expected future location of client device 210, that can determine an expected route of client device 210, that can determine information representing a map fragment associated with the expected future location and/or the expected route of client device 210, that can determine speed limit information associated with the map fragment, that can transmit the information representing the map fragment and the speed limit information to client device 210, and/or the like. In some implementations, mapping platform 220 is implemented by computing resources 225 of cloud computing environment 230. In some implementations, mapping platform 220 can store and/or provide access to map fragment information, to speed limit information, and/or other types of information. In some implementations, mapping platform 220 can additionally store and/or provide access to various information traffic information, hazard information, toll information, and/or the like.

Mapping platform 220 can include a server device or a group of server devices. In some implementations, Mapping platform 220 can be hosted in cloud computing environment 230. Notably, while implementations described herein describe mapping platform 220 as being hosted in cloud computing environment 230, in some implementations, mapping platform 220 may not be cloud-based or can be partially cloud-based.

Cloud computing environment 230 includes an environment that delivers computing as a service, whereby shared resources, services, etc. can be provided to mapping platform 220. Cloud computing environment 230 can provide computation, software, data access, storage, and/or other services that do not require end-user knowledge of a physical location and configuration of a system and/or a device that delivers the services. As shown, cloud computing environment 230 can include mapping platform 220 and computing resource 225.

Computing resource 225 includes one or more personal computers, workstation computers, server devices, or another type of computation and/or communication device. In some implementations, computing resource 225 can host mapping platform 220. The cloud resources can include compute instances executing in computing resource 225, storage devices provided in computing resource 225, data transfer devices provided by computing resource 225, etc. In some implementations, computing resource 225 can communicate with other computing resources 225 via wired connections, wireless connections, or a combination of wired and wireless connections.

As further shown in FIG. 2, computing resource 225 can include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that can be provided to or accessed by client device 210. Application 225-1 can eliminate a need to install and execute the software applications on client device 210. For example, application 225-1 can include software associated with mapping platform 220 and/or any other software capable of being provided via cloud computing environment 230. In some implementations, one application 225-1 can send/receive information to/from one or more other applications 225-1, via virtual machine 225-2.

Virtual machine 225-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 225-2. A system virtual machine can provide a complete system platform that supports execution of a complete operating system ("OS"). A process virtual machine can execute a single program, and can support a single process. In some implementations, virtual machine 225-2 can execute on behalf of a user (e.g., client device 210), and can manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
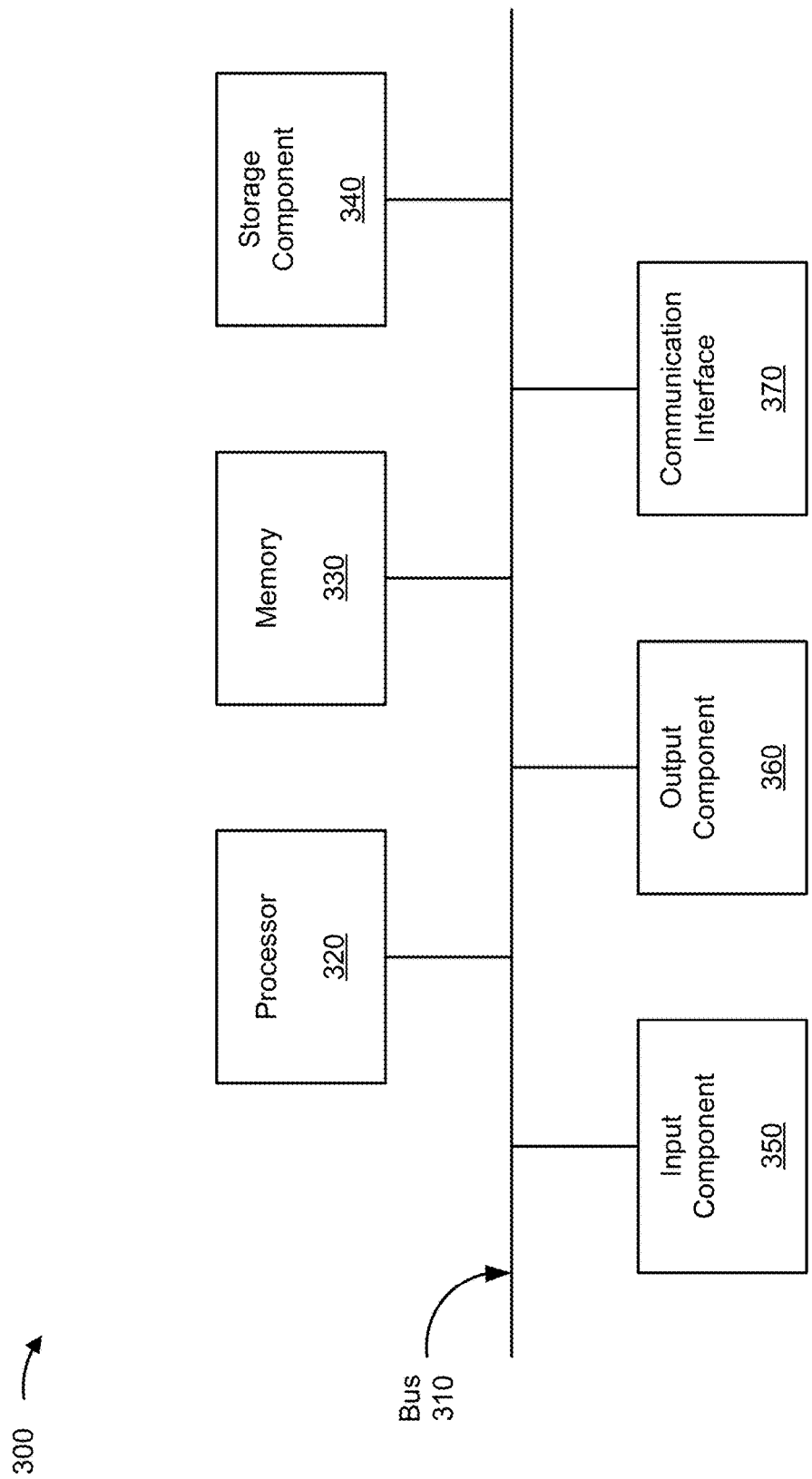
FIG. 3 is a diagram of example components of one or more devices of FIG. 2.

FIG. 3 is a diagram of example components of a device 300. Device 300 can correspond client device 210, mapping platform 220, and/or computing resource 225. In some implementations client device 210, mapping platform 220, and/or computing resource 225 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
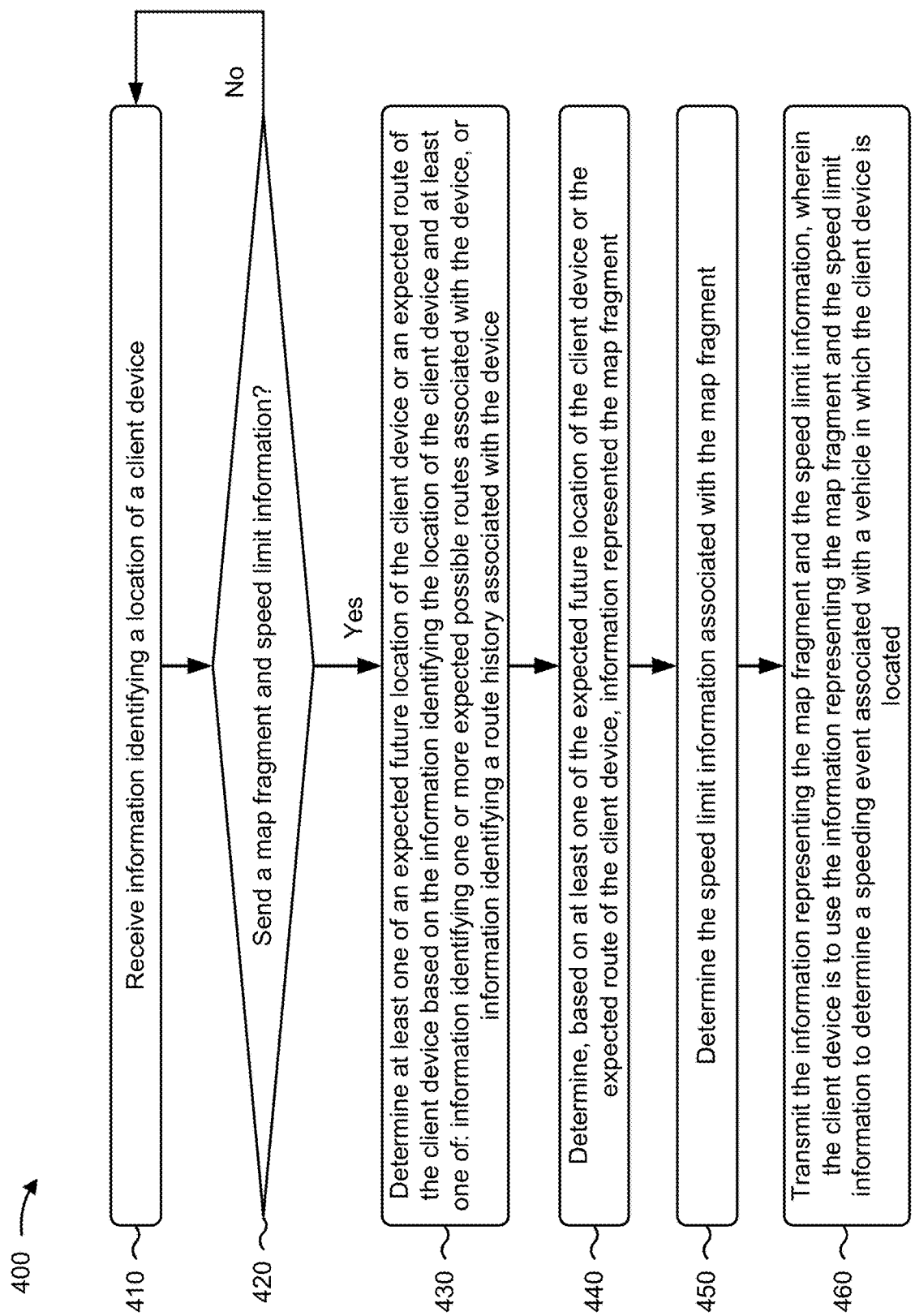
FIG. 4 is a flow chart of an example process for providing map fragments to a device.

FIG. 4 is a flow chart of an example process 400 for providing map fragments to a device. In some implementations, one or more process blocks of FIG. 4 can be performed by a mapping platform (e.g., mapping platform 220). In some implementations, one or more process blocks of FIG. 4 can be performed by another device or a group of devices separate from or including the mapping platform, such as a client device (e.g., client device 210), and/or another device.

As shown in FIG. 4, process 400 can include receiving information identifying a location of a client device (block 410). For example, the mapping platform (e.g., using processor 320, memory 330, storage component 340, input component 350, and/or the like) can receive information identifying a location of a client device, as described above in connection with FIGS. 1A-1G.

As further shown in FIG. 4, process 400 can include determining whether to transmit information representing a map fragment and speed limit information based on receiving the information identifying the location of the client device (block 420). For example, the mapping platform (e.g., using processor 320, memory 330, storage component 340, input component 350, and/or the like) can determine whether to transmit information representing a map fragment and speed limit information based on receiving the information identifying the location of the client device, as described above in connection with FIGS. 1A-1G. In some implementations, if the mapping platform determines to not transmit the information representing the map fragment and the speed limit information to the client device, process 400 can return to block 410.

As further shown in FIG. 4, if the mapping platform determines to transmit the information representing the map fragment and the speed limit information to the client device, process 400 can include determining at least one of an expected future location of the client device or an expected route of the client device based on the information identifying the location of the client device and at least one of: information identifying one or more expected possible routes associated with the client device, or information identifying a route history associated with the client device (block 430). For example, the mapping platform (e.g., mapping platform 220 using processor 320, memory 330, storage component 340, output component 360, and/or the like) can determine at least one of an expected future location of the client device or an expected route of the client device based on the information identifying the location of the client device and at least one of: information identifying one or more expected possible routes associated with the client device, or information identifying a route history associated with the client device, as described above in connection with FIGS. 1A-1G.

As further shown in FIG. 4, process 400 can include determining, based on the expected future location of the client device or the expected route of the client device, information representing the map fragment (block 440). For example, the mapping platform (e.g., mapping platform 220 using processor 320, memory 330, storage component 340, output component 360, and/or the like) can determine, based on the expected future location of the client device or the expected route of the client device, information representing the map fragment, as described above in connection with FIGS. 1A-1G.

As further shown in FIG. 4, process 400 can include determining the speed limit information associated with the map fragment (block 450). For example, the mapping platform (e.g., mapping platform 220 using processor 320, memory 330, storage component 340, output component 360, and/or the like) can determine the speed limit information associated with the map fragment, as described above in connection with FIGS. 1A-1G.

As further shown in FIG. 4, process 400 can include transmitting the information representing the map fragment and the speed limit information, wherein the client device is to use the information representing the map fragment and the speed limit information to determine a speeding event associated with a vehicle in which the client device is located (block 460). For example, the mapping platform (e.g., mapping platform 220 using processor 320, memory 330, storage component 340, output component 360, and/or the like) can transmit the information representing the map fragment and the speed limit information, as described above in connection with FIGS. 1A-1G. In some implementations, the client device (e.g., mapping platform 220 using processor 320, memory 330, storage component 340, input component 350, and/or the like) can use the information representing the map fragment and the speed limit information to determine a speeding event associated with a vehicle in which the client device is located.

Process 400 can include additional implementations, such as any single implementation or any combination of implementations described below and/or in connection with one or more other processes described elsewhere herein.

In some implementations, when determining the information representing the map fragment, the mapping platform can determine the information representing the map fragment based on at least one of: available storage resources associated with the client device, capability of a network connection of the client device, or a type of road on which the vehicle is traveling.

In some implementations, when transmitting the information representing the map fragment and the speed limit information, the mapping platform can determine that the client device is storing a previous version of the information representing the map fragment, determine whether the information representing the map fragment and the previous version of the information representing the map fragment are different, and transmit, based on determining the information representing the map fragment and the previous version of the information representing the map fragment are different, the information representing the map fragment and the speed limit information.

In some implementations, when determining the information representing the map fragment, the mapping platform can determine the information representing the map fragment based on at least one of: the information identifying the one or more expected possible routes associated with the client device, or the information identifying the route history associated with the client device. In some implementations, wherein determining the information representing the map fragment, the mapping platform can remove, from the information representing the map fragment, one or more roads that are not included in the one or more expected possible routes associated with the client device.

In some implementations, wherein transmitting the information representing the map fragment and the speed limit information, the mapping platform can determine that the client device is storing a previous version of the information representing the map fragment, determine whether a duration of time since the client device transmitted the previous version of the information to the client device satisfies a threshold duration of time, and transmit, based on determining that the duration of time since the client device transmitted the previous version of the information to the client device satisfies the threshold duration of time, the information representing the map fragment and the speed limit information.

In some implementations, when transmitting information representing the map fragment and the speed limit information to the client device, the mapping platform can transmit, to the client device, at least one of: road hazard information associated with the map fragment, traffic information associated with the map fragment, or toll information associated with the map fragment.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, the mapping platform can provide map fragments to the client device, thereby reducing the amount of information needed to be sent to the client device for the client device to determine a speeding event. This conserves computing resources and storage resources of both the mapping platform and the client device associated with sending and receiving the map fragments and speed limit information. Further, this conserves networking resources associated with transmitting the information associated with sending and receiving the map fragments and speed limit information.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive, from a client device, information identifying a location of the client device;
   determine one or more candidate locations based on the information identifying the location of the client device and at least one of:
   information identifying one or more expected possible routes associated with the client device, or
   information identifying a route history associated with the client device;
   determine a particular route, from a plurality of routes associated with the route history, that was traversed a greatest number of times with respect to other routes of the plurality of routes;
   determine, based on determining whether or not a particular candidate location of the one or more candidate locations is accessible from a road, which the client device is traveling on, for a first threshold distance, accessibility information associated with the particular candidate location;
   determine, based on the particular route, and based on the accessibility information, the particular candidate location as an expected future location that the client device is to be located at a future time,
wherein the particular candidate location is included in the particular route;
determine, based on the expected future location of the client device, information representing a map fragment,
wherein a size of the information representing the map fragment is dynamically determined based on whether bandwidth of a network connection associated with the client device is being used by one or more first applications with a higher priority than a second application associated with the map fragment; determine, based on an average speed of one or more first vehicles associated with a road segment of the map fragment, speed limit information associated with the map fragment; and
transmit, from the device, to the client device and based on a second threshold distance between the location of the client device and the expected future location of the client device, the information representing the map fragment and the speed limit information,
wherein the information representing the map fragment and the determined speed limit information are used to determine a speeding event associated with a second vehicle in which the client device is located, and
wherein the speeding event is associated with a speed of the second vehicle exceeding the determined speed limit information.

2. The device of claim 1, wherein the one or more processors, when determining the information representing the map fragment, are to:
determine the information representing the map fragment based on a capability of the network connection.

3. The device of claim 1, wherein the one or more processors, when transmitting the information representing the map fragment and the speed limit information, are to:
determine that the client device is storing a previous version of the information representing the map fragment;
determine whether the information representing the map fragment and the previous version of the information representing the map fragment are different; and
transmit, based on determining the information representing the map fragment and the previous version of the information representing the map fragment are different, the information representing the map fragment and the speed limit information.

4. The device of claim 1, wherein the one or more processors, wherein determining the information representing the map fragment, are to:
remove, from the information representing the map fragment, one or more roads that are not included in the one or more expected possible routes,
wherein the one or more expected possible routes are determined based on at least one of:
identifying a plurality of roads within a particular time radius from the location of the client device, wherein the particular time radius is associated with an area the client device is expected to cover in a particular time period, or identifying a plurality of roads that lead to a particular destination.

5. The device of claim 1, wherein the one or more processors, when transmitting the information representing the map fragment and the speed limit information, are to:
determine that the client device is storing a previous version of the information representing the map fragment;
determine whether a duration of time since the device transmitted the previous version of the information to the client device satisfies a threshold duration of time; and
transmit, based on determining that the duration of time since the device transmitted the previous version of the information to the client device satisfies the threshold duration of time, the information representing the map fragment and the speed limit information.

6. The device of claim 1, wherein the one or more processors, when transmitting information representing the map fragment and the speed limit information to the client device, are to:
transmit, to the client device, at least one of:
road hazard information associated with the map fragment,
traffic information associated with the map fragment, or
toll information associated with the map fragment.

7. The device of claim 1, wherein the expected future location of the client device or the one or more expected possible routes is determined based on identifying a plurality of roads within a particular time radius from the location of the client device,
wherein the particular time radius is associated with an area the client device is expected to cover in a particular time period.

8. The device of claim 1, wherein the size of the information representing the map fragment is determined further based on information associated with signal strength of the network connection.

9. A method, comprising:
receiving, by a device and from a client device, information identifying a location of the client device;
determining, by the device, one or more candidate locations based on the information identifying the location of the client device and at least one of:
information identifying one or more expected possible routes associated with the client device, or
information identifying a route history associated with the client device;
determining, by the device, a particular route, from a plurality of routes associated with the route history, that was traversed a greatest number of times with respect to other routes of the plurality of routes;
determining, by the device and based on determining whether or not a particular candidate location of the one or more candidate locations is accessible from a road, which the client device is traveling on, for a first threshold distance, accessibility information associated with the particular candidate location;
determining, by the device, based on the particular route, and based on the accessibility information, the particular candidate location as an expected future location that the client device is to be located at a future time, wherein the particular candidate location is included in the particular route;
determining, by the device, based on the expected future location of the client device, information representing a map fragment,
wherein a size of the information representing the map fragment is dynamically determined based on whether bandwidth of a network connection associated with the client device is being used by one or more first applications with a higher priority than a second application associated with the map fragment;

determining, by the device and based on an average speed of one or more first vehicles associated with a road segment of the map fragment, speed limit information associated with the map fragment; and transmitting, by the device, to the client device, and based on a second threshold distance between the location of the client device and the expected future location of the client device, the information representing the map fragment and the speed limit information, wherein the information representing the map fragment and the determined speed limit information are used to determine a speeding event associated with a second vehicle in which the client device is located, and wherein the speeding event is associated with a speed of the second vehicle exceeding the determined speed limit information.

10. The method of claim 9, wherein determining the information representing the map fragment comprises:

determining the information representing the map fragment based on a capability of the network connection.

11. The method of claim 9, wherein transmitting the information representing the map fragment and the speed limit information comprises:

determining that the client device is storing a previous version of the information representing the map fragment;

determining whether the information representing the map fragment and the previous version of the information representing the map fragment are different; and transmitting, based on determining the information representing the map fragment and the previous version of the information representing the map fragment are different, the information representing the map fragment and the speed limit information.

12. The method of claim 9, wherein determining the information representing the map fragment, comprises:

removing, from the information representing the map fragment, one or more roads that are not included in the one or more expected possible routes, wherein the one or more expected possible routes are determined based on at least one of:

identifying a plurality of roads within a particular time radius from the location of the client device, wherein the particular time radius is associated with an area the client device is expected to cover in a particular time period, or identifying a plurality of roads that lead to a particular destination.

13. The method of claim 9, wherein transmitting the information representing the map fragment and the speed limit information, comprises:

determining that the client device is storing a previous version of the information representing the map fragment;

determining whether a duration of time since the device transmitted the previous version of the information to the client device satisfies a threshold duration of time; and transmitting, based on determining that the duration of time since the device transmitted the previous version of the information to the client device satisfies the threshold duration of time, the information representing the map fragment and the speed limit information.

14. The method of claim 9, wherein transmitting the information representing the map fragment and the speed limit information to the client device comprises transmitting, to the client device, at least one of:

road hazard information associated with the map fragment, traffic information associated with the map fragment, or toll information associated with the map fragment.

15. The method of claim 9, further comprising:

determining, based on an amount of available storage resources associated with the client device, the size of the information representing the map fragment that is to be transmitted to the client device.

16. A non-transitory computer-readable medium storing instructions, the instructions comprising:

one or more instructions that, when executed by one or more processors, cause the one or more processors to:

receive, from a client device, information identifying a location of the client device;

determine one or more candidate locations based on the information identifying the location of the client device and at least one of:

information identifying one or more expected possible routes associated with the client device, or information identifying a route history associated with the client device;

determine a particular route, from a plurality of routes associated with the route history, that was traversed a greatest number of times with respect to other routes of the plurality of routes;

determine, based on determining whether or not a particular candidate location of the one or more candidate locations is accessible from a road, which the client device is traveling on, for a first threshold distance, accessibility information associated with the particular candidate location;

determine based on the particular route and based on the accessibility information the particular candidate location as an expected future location that the client device is to be located at a future time, wherein the particular candidate location is included in the particular route;

determine, based on the expected future location of the client device, information representing a map fragment, wherein a size of the information representing the map fragment is dynamically determined based on whether bandwidth of a network connection associated with the client device is being used by one or more first applications with a higher priority than a second application associated with the map fragment; determine, based on an average speed of one or more first vehicles associated with a road segment of the map fragment, speed limit information associated with the map fragment; and transmit, to the client device and based on a second threshold distance between the location of the client device and the expected future location of the client device, the information representing the map fragment and the speed limit information, wherein the information representing the map fragment and the determined speed limit information are used to determine a speeding event associated with a second vehicle in which the client device is located, and wherein the speeding event is associated with a speed of the second vehicle exceeding the determined speed limit information.

17. The non-transitory computer-readable medium of claim 16, wherein the one or more instructions, that cause the one or more processors to determine the information representing the map fragment, cause the one or more processors to:
   determine the information representing the map fragment based on a capability of the network connection.

18. The non-transitory computer-readable medium of claim 16, wherein the one or more instructions, that cause the one or more processors to transmit the information representing the map fragment and the speed limit information, cause the one or more processors to:
   determine that the client device is storing a previous version of the information representing the map fragment;
   determine whether the information representing the map fragment and the previous version of the information representing the map fragment are different; and
   transmit, based on determining the information representing the map fragment and the previous version of the information representing the map fragment are different, the information representing the map fragment and the speed limit information.

19. The non-transitory computer-readable medium of claim 16, wherein the one or more instructions, that cause the one or more processors to determine the information representing the map fragment, cause the one or more processors to:
   remove, from the information representing the map fragment, one or more roads that are not included in the one or more expected possible routes.

20. The non-transitory computer-readable medium of claim 16, wherein the one or more instructions, that cause the one or more processors to transmit the information representing the map fragment, cause the one or more processors to:
   determine that the client device is storing a previous version of the information representing the map fragment;
   determine whether a duration of time since the device transmitted the previous version of the information to the client device satisfies a threshold duration of time; and
   transmit, based on determining that the duration of time since the device transmitted the previous version of the information to the client device satisfies the threshold duration of time, the information representing the map fragment and the speed limit information.

* * * * *